(12) United States Patent
DelZotto

(10) Patent No.: US 7,033,107 B2
(45) Date of Patent: Apr. 25, 2006

(54) PRE-CAST DECK, DOCK STEPS AND DOCK SYSTEM

(76) Inventor: Laurie Ann DelZotto, 4950 NW. 150th Ave., Morriston, FL (US) 32668

( * ) Notice: Subject to any disclaimer, the term of this patent is extended or adjusted under 35 U.S.C. 154(b) by 0 days.

(21) Appl. No.: 10/912,719

(22) Filed: Aug. 5, 2004

(65) Prior Publication Data

US 2006/0029471 A1    Feb. 9, 2006

(51) Int. Cl.
*B63C 1/08* (2006.01)
(52) U.S. Cl. .................. 405/5; 405/4; 52/295
(58) Field of Classification Search ............ 405/4, 405/5, 218; 52/294, 295; 114/44, 45, 48
See application file for complete search history.

(56) References Cited

U.S. PATENT DOCUMENTS

| | | | | |
|---|---|---|---|---|
| 3,270,698 A | * | 9/1966 | Fort .................... | 114/45 |
| 3,381,483 A | * | 5/1968 | Huthsing, Jr. ......... | 405/262 |
| 3,503,467 A | * | 3/1970 | Lindblad ............... | 182/97 |
| 3,952,528 A | * | 4/1976 | Donkersloot ........... | 405/221 |
| 4,804,298 A | * | 2/1989 | Nasby, Jr. ............. | 405/218 |
| 2002/0095892 A1 | | 7/2002 | Johnson | |

\* cited by examiner

*Primary Examiner*—Jong-Suk (James) Lee
(74) *Attorney, Agent, or Firm*—Frank B. Arenas

(57) ABSTRACT

A pre-cast article of manufacture, system and method of manufacturing and constructing a deck, dock step(s) and dock is disclosed utilizing 2 main components, beam(s) and slab(s). Optional accessories are also disclosed that may be added such as hand rail(s), boat bumper(s) and water access ladder(s).

16 Claims, 15 Drawing Sheets

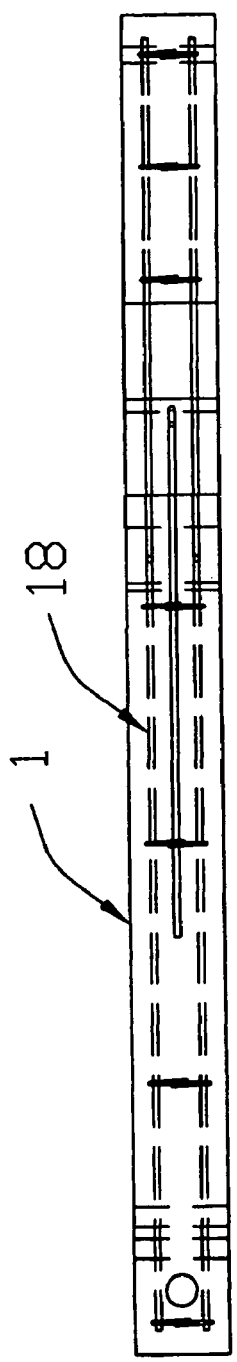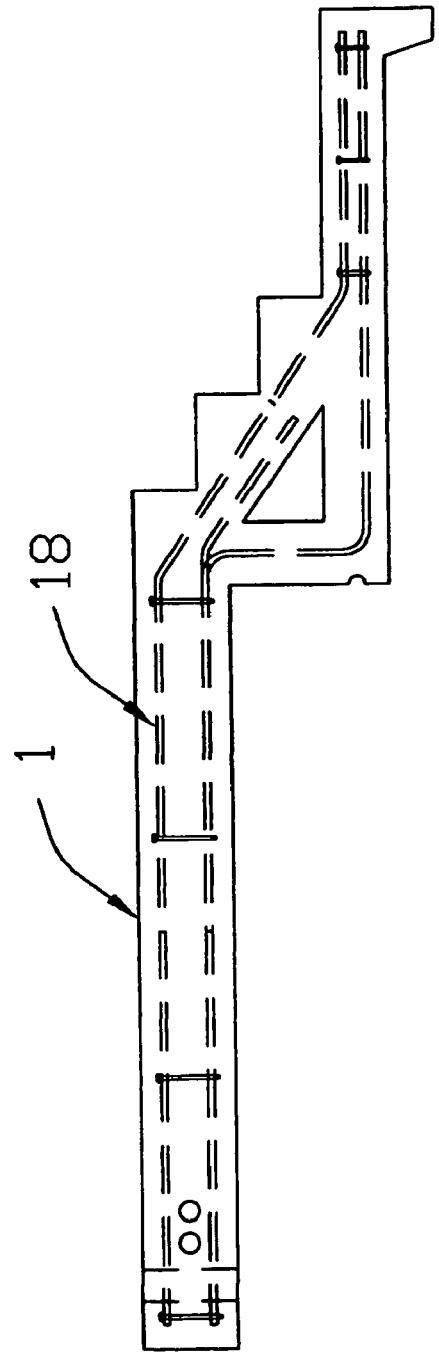

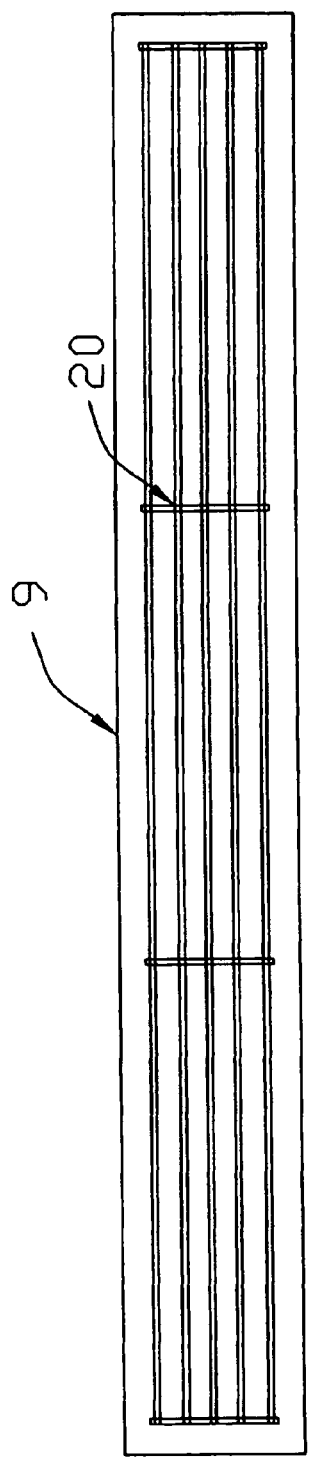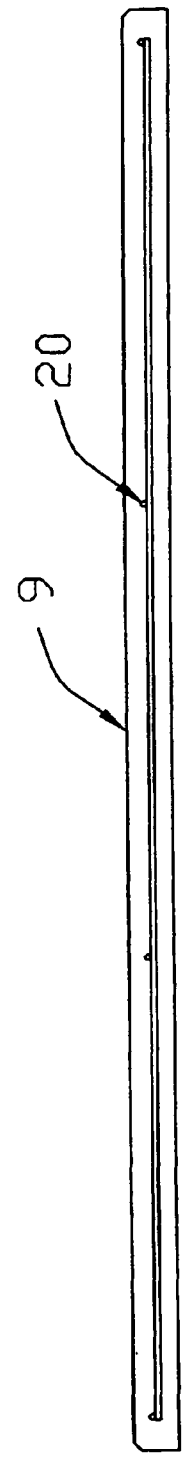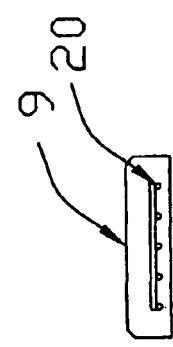

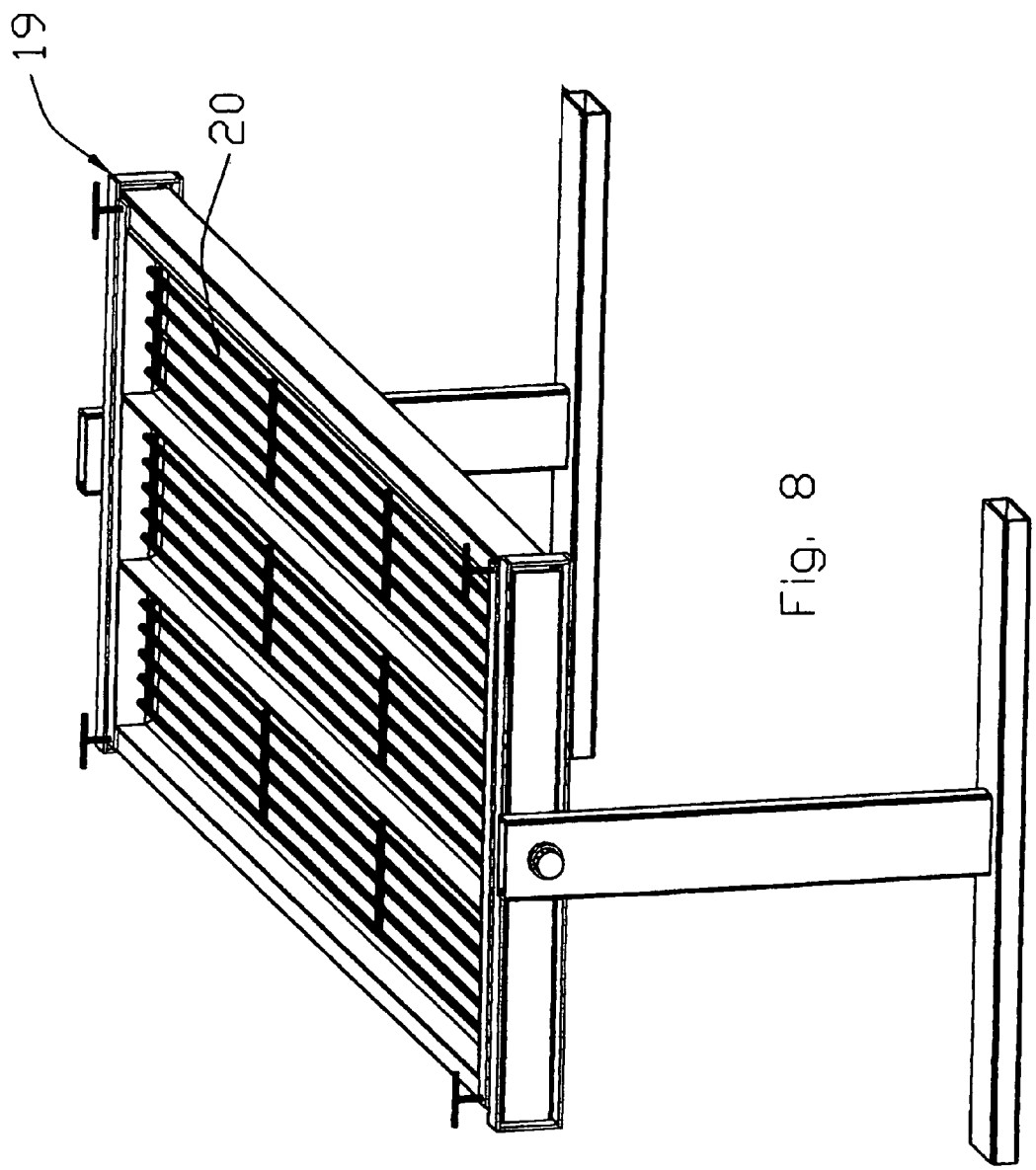

PRE-CAST DECK, DOCK STEPS AND DOCK SYSTEM

BACKGROUND OF THE INVENTION

1. Field of the Invention

The present invention relates generally to pre-cast concrete products. The invention particularly relates to pre-cast decks, dock steps and docks, as they are commonly referred to in the marine industry. The invention more particularly relates to pre-cast decks, dock steps and docks utilized over existing sea walls and uniquely anchored using cantilever methods and earth support behind the existing sea wall and not using conventional vertical pilings driven into the sea floor per is the custom and practice in the marine industry. Additionally, the existing sea wall is not stressed laterally by the dock pulling on the existing sea wall in the conventional manner due to the unique anchoring method on the shoreline. This invention reinforces and earth anchors the existing (or optionally new) sea wall.

2. Description of the Prior Art

On the shoreline, sea walls and docks for mooring boats and waterfront activities have been in use for many years. The shoreline (or sea wall) define the inland side (inland end) of the shoreline (or sea wall) and the water side (water end) of the shoreline (or sea wall) where the water activities (swimming, boating, diving, etc.) occur. Conventional dock systems use vertical pilings, typically made of wood or concrete, driven into the sea floor and used to support the dock above the water line on beams spanning between the pilings. Additionally, docks used in conjunction with an existing sea wall typically use the sea wall for a support member at the water's edge. This prior art method places additional loads and stress on the existing sea wall via a ledge anchored to the top water side face of the sea wall and used for support of the dock. This is especially important for safety reasons, if the existing sea wall was not originally designed for the added loads and stress. These added loads and stress on the existing sea wall may cause structural or at the least cosmetic damage to the existing sea wall.

U.S. patent application Ser. No. 10/042,871 by Johnson discloses a cantilevered structural support and mentions uses of docks and piers, but contains no steps and discloses no use of the seawall, as does the present invention.

None of the prior art addresses or solves this problem. This new and useful pre-cast deck, dock steps and dock invention solves these marine dock industry problems in a safe and economical manner.

SUMMARY OF THE INVENTION

It is an object of the invention to help prevent disturbance of the sea floor for docks and dock step systems when constructed in conjunction with sea walls.

It is another object of the invention to allow a pre-cast, modular system to be installed over existing or new sea walls with an independent anchoring system that reduces loads and stress on the sea wall.

It is a further object of the present invention to allow the earth behind the sea wall to be an anchor point for the deck, dock step(s) and dock system for a cantilever beam design supporting at least one pre-cast slab used as a deck, at least one pre-cast slab used as a step and at least one pre-cast slab used as a dock extending out over the surface of the water with no piling supports in the sea floor.

Another object is to provide fast, efficient dock erection with the least on-site field work needed due to the pre-cast design and construction.

The objects of this invention are achieved and the present invention provides a new and useful system, article of manufacture and process for making said article of manufacture comprising a pre-cast deck, dock step(s) and dock, (the preferred embodiment of which is disclosed in FIG. 21, FIG. 22, FIG. 23 and FIG. 24) which can be integrated anywhere into the shoreline but preferably integrated into or attached to the existing sea wall and cantilevered at or over the water's surface for boating, swimming or other uses.

This invention is of simple construction that is easy to make and use and needs very little maintenance.

BRIEF DESCRIPTION OF THE DRAWINGS

FIG. 1 depicts a side view of the cantilever Z beam with reinforcement bars therein.

FIG. 2 depicts a top view of the cantilever Z beam with reinforcement bars therein.

FIG. 3 depicts a top longitudinal sectional view of the slab with reinforcing bars.

FIG. 4 depicts a side longitudinal sectional view of the slab with reinforcing bars.

FIG. 5 depicts a cross-sectional view of the slab with reinforcing bars.

FIG. 8 shows the pre-cast concrete gang mold for mass production (3 at a time) of the slabs with reinforcement bars therein, on tilt table and ready to pour concrete for manufacture.

DETAILED DESCRIPTION OF THE PREFERRED EMBODIMENT

Figure 6:
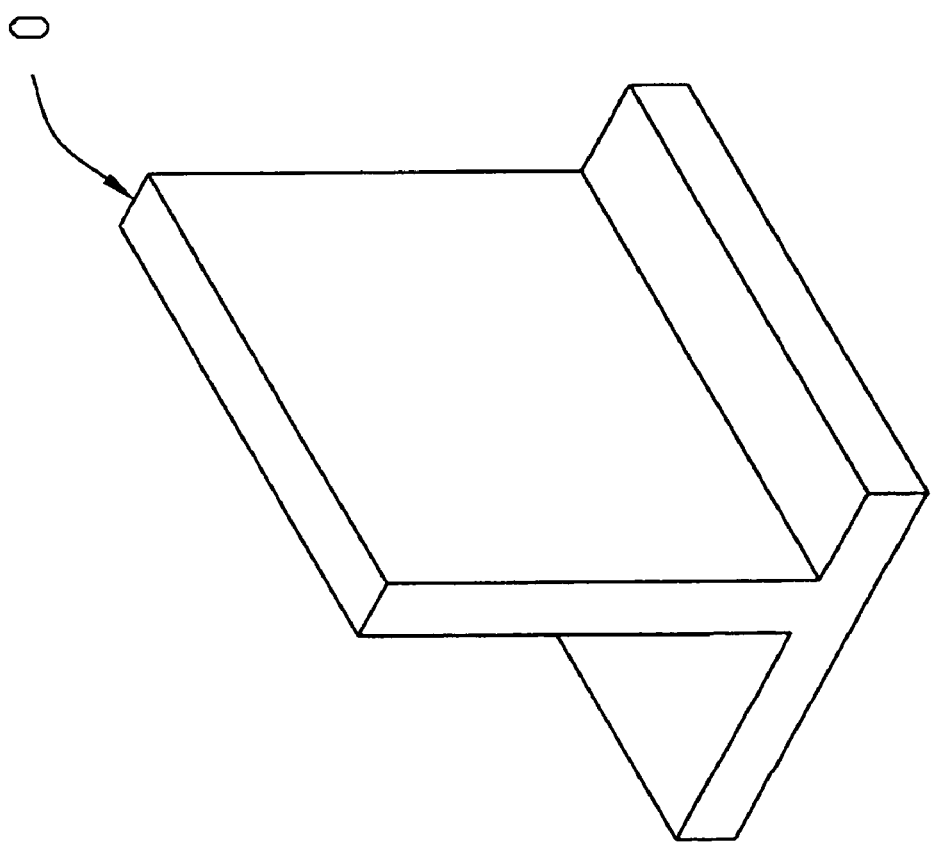
FIG. 6 depicts the optional pre-cast sea wall component.

The apparatus of the invention is conveniently fabricated by conventional and standard methods using conventional and standard materials common in the concrete and pre-cast fabrication industries. The preferred material is pre-cast concrete, but other materials may be used.

For example, the dock and dock step(s) system ("the system") may be fabricated from aluminum, stainless steel or like metals or any other suitable material, even wood. The system may also be fabricated from non-metallic materials for lighter weight and corrosion resistance. Theses non-metallic materials include, among others, conventional polymers such as, for example, polystyrene, polycarbonate, polyurethane, polyethylene, phenol formaldehyde resins, polybutylene, Teflon and the like. These above-mentioned materials are examples and do not limit the types of materials that can be used to make and use the system; any and all suitable materials may be used. The components of the system may be integrated together by standards means such as pouring, casting, welding, bolting, gluing, riveting, or any other suitable means.

The system and method of making and using the invention will now be further described and exemplified by reference to the various specific embodiments set forth in the drawings. The Figures illustrate views of the preferred embodiment of the invention.

Again referring to the Figures, the assembly and fabrication (making) of the preferred embodiment of the invention will be described in detail. The system is assembled and fabricated from standard materials and methods now used in the appropriate industries. Typically, the system is a pre-cast concrete beam, slab(s) and step(s) solidly connected to the each other to form a body. The body is typically at least one rigid horizontal modified Z-shaped beam member of sufficient strength, length, width and depth to accomplish support of the weight of at least an average or above average person. The dock is typically at least one pre-cast concrete slab horizontal member directly (or indirectly) bearing on the beam of sufficient strength, length, width and depth to accomplish support of the weight of at least an average or above average person. The step(s) are typically at least one rigid horizontal member of sufficient strength, length, width and depth to accomplish support of the weight of at least an average or above average person. Optionally, the steps may be made of slip-resistant design integrated into the top surface of the step(s). Or, a slip-resistant finish may be applied to the top surface of the step(s). Typically, the attachment means employed for attaching the system to the earth and sea wall is sufficient to accomplish support of at least the weight of an average or above average person. The preferred earth attachment means are reinforcing rod anchors horizontally and optionally vertically to anchor each section and poured into place with concrete at the site for support. The system is typically fabricated from pre-cast concrete, formed using conventional pre-cast techniques such as forming, pouring, cutting, smoothing, curing, removing the forming and polishing or finishing. The system is shown with its design, functional aspects and relationship of components in scalable form in all of the drawings combined. The openings in the system allow for wave action to dissipate without undue stress created on the system or integrated sea wall. Or, in another embodiment, an optional pre-cast sea wall is first placed at the shoreline, backfilled and then used for support for the deck, dock-step and dock components. All of the inventor's shop drawings, notes, specifications, working drawings, plans, manuals and all other related printed and written documents are hereby incorporated herein by reference.

To make the system in the preferred embodiment and best mode, it is formed by the manufacturer in the appropriate shaped forms. The entire system uses two (2) basic components. A cantilevered Z beam is the first component. The cantilever Z beam(s) are a modified Z-shape as depicted in FIG. 1. FIG. 2 shows a top view of the beam. Typically, the cantilever Z beam is about 12 inches wide, extends about 10 feet back from the sea wall onto the land, steps down twice about 8 inches each step and projects outward over the water's surface about 5 feet. Typically the steel reinforcement bars are industry standard rebars. Alternately, steel "I" beam, stainless steel rods, epoxy coated rebar, galvanized rebar, steel or fiberglass mesh or any other suitable reinforcement means can be used.

The second component is a slab. FIG. 3, FIG. 4 and FIG. 5 shows the slab details. The slab is modular in nature and typically 8 feet long, 1 foot wide and 3 inches deep as shown in the above-referenced drawings. Typically the steel reinforcement bars are industry standard rebars. Alternately, steel "I" beam, stainless steel rods, epoxy coated rebar, galvanized rebar, steel or fiberglass mesh or any other suitable reinforcement means can be used. The slab is used in modular units on the top surface of the cantilever Z beam to build the patio surface over the shoreline, the steps and the dock projecting over the water's surface.

FIG. 6 shows the optional pre-cast sea wall is typically 6 feet tall, 1 foot deep (or sloped with a variable depth), 20 feet wide, and on an integrated pre-cast foundation slab about 4 feet back into the earth-side of the sea wall and 1 foot into the water-side of the sea wall. Typically the steel reinforcement bars are industry standard rebars. Alternately, steel "I" beam, stainless steel rods, epoxy coated rebar, galvanized rebar, steel or fiberglass mesh or any other suitable reinforcement means can be used.

Ideally, the two basic components (and the third optional component) are fabricated in an PreCast Concrete Association of America (PCAA) certified pre-cast plant using approved standards for reinforcing, concrete mix designs, casting procedures, quality control, etc. and complying with all local codes and American Concrete Institute (ACI)-318 requirements. All related manuals, specifications and other printed documents generated by PCAA and ACI are hereby incorporated by reference.

Figure 7:
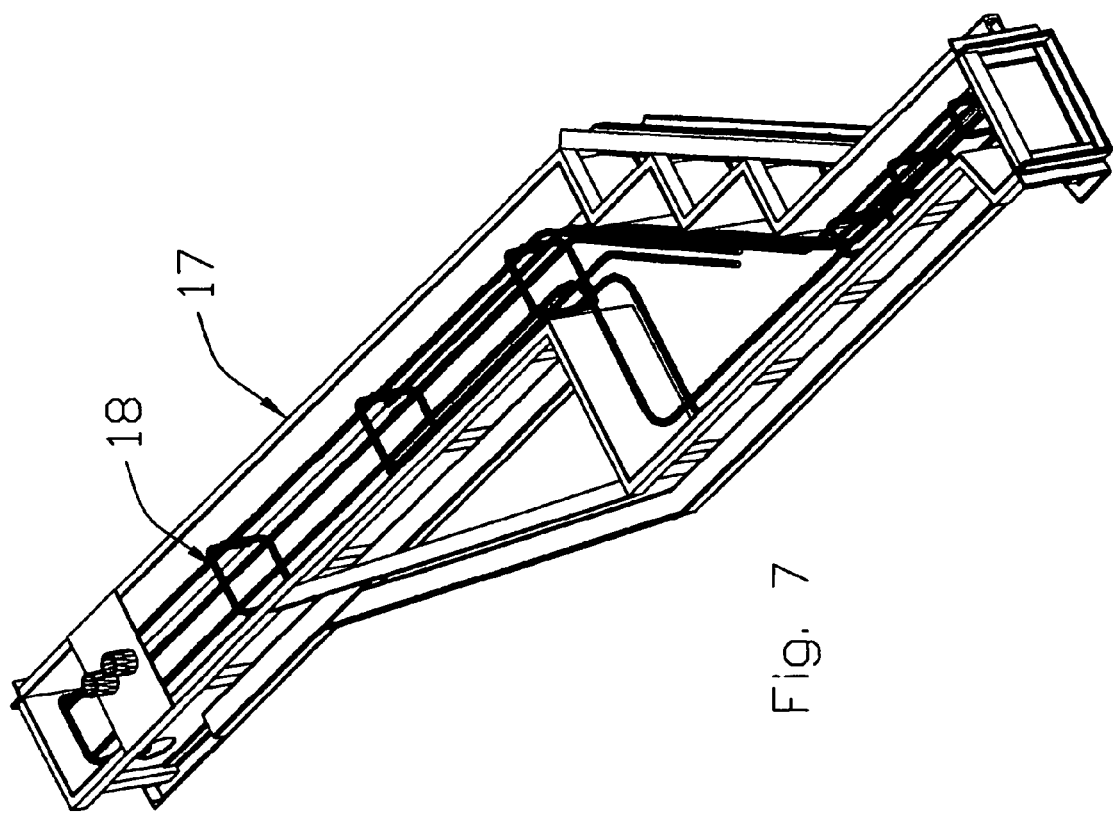
FIG. 7 shows the pre-cast concrete mold for the cantilever Z beam with reinforcement bars therein, ready to pour concrete for manufacture.

To make the invention, appropriate steel angle perimeter molds, pan molds and gang form molds (for mass production) in the proper dimensions, all typical in the pre-cast industry, are used on either a smooth casting surface or steel casting tilt-table. FIG. 7 shows a typical cantilevered Z beam mold 17 with rebars 18 inserted on chairs, ready to be poured with concrete. FIG. 8 shows a typical gang form 19 with 3 typical slabs with rebars 20 on chairs in the molds, on a steel tilt-table, ready to be poured with concrete. Typically, the concrete is 4,000 PSI and chemicals may be added for hardening, curing and chloride (salt) resistance. In best mode, the concrete cures in 24 hours, enabling the forms of the slab(s) and cantilevered Z beam(s) to be stripped and the components stored about 20 days for final curing. After the components are fully cured, they are loaded onto a suitable truck (typically a flat-bed). A typical unit of the pre-cast dock step system contains (2) two cantilevered Z beams and (14) fourteen slabs spanning between the beams. These components will build a system with a 9 feet long by 8 feet wide deck on the land-side of the shoreline, two 12 inches long by 8 feet wide steps (with 8 inch risers) leading down to a 3 feet long by 8 feet wide dock protruding over the water's surface. For wider decks, steps and docks, more of the above-referenced units are constructed on either side of the first unit at the appropriate spacing. The above-referenced dimensions are illustrative only and used merely as examples, as the system may be made in any and all dimensions (sizes) desired by the manufacturer and user.

The above-referenced components are then trucked to the site at the shoreline where the system is to be erected. The site is prepared by excavating or adding clean dirt fill, as needed, to provide a level earth surface inland, typically 9 feet minimum from the sea wall.

Figure 10:
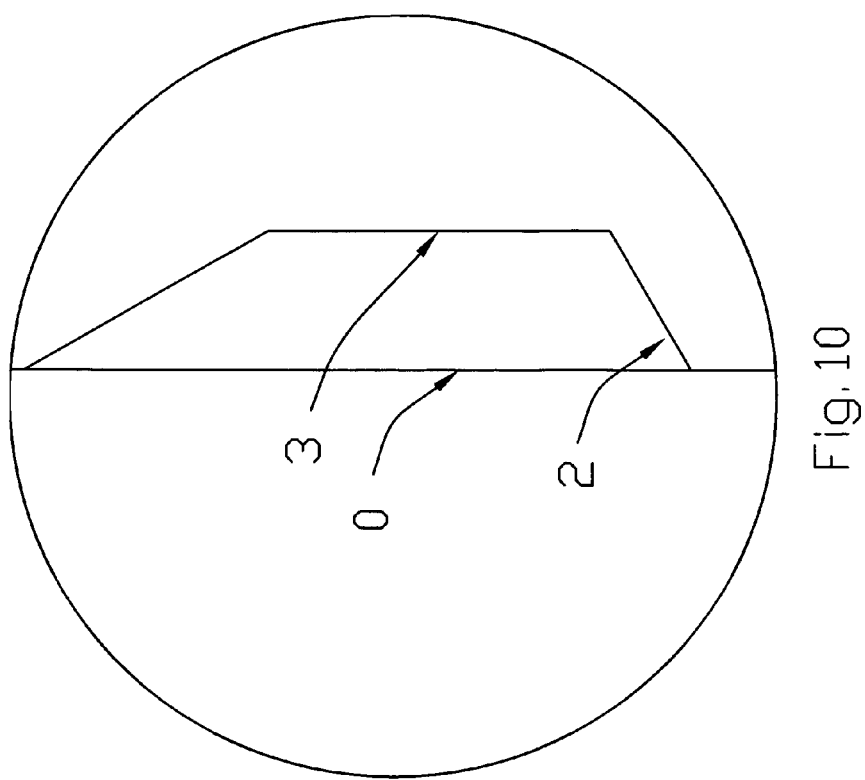
FIG. 10 depicts a close-up detail of the heel of the beam and wedging against the side of the sea wall.
Figure 9:
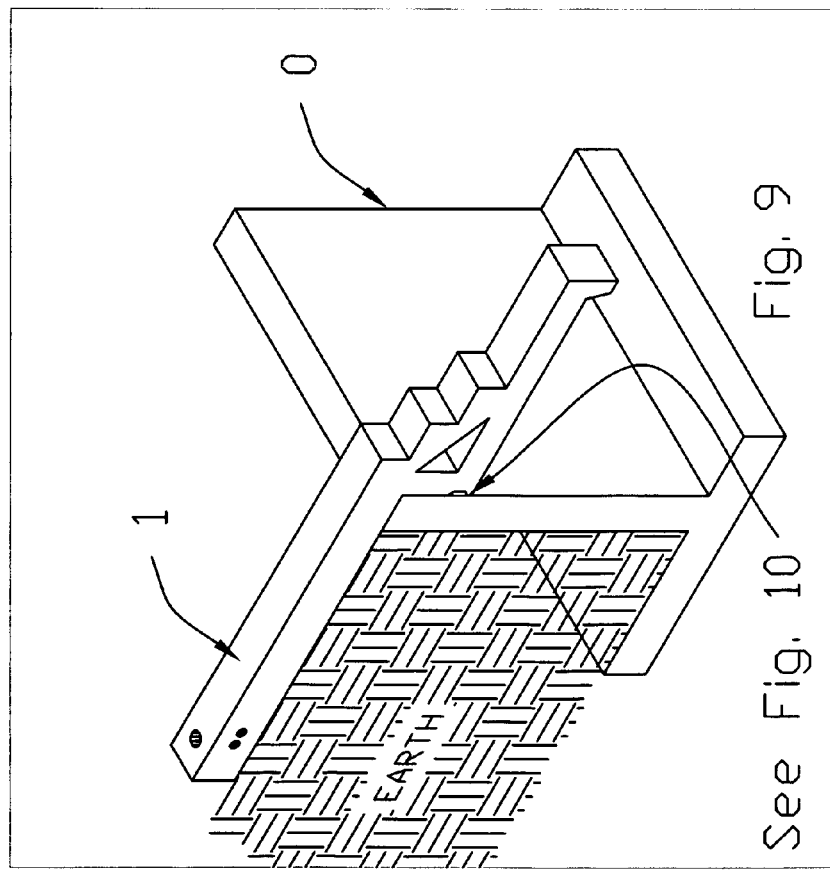
FIG. 9 depicts the optional pre-cast sea wall component with the cantilever Z beam placed perpendicular to and on top of the sea wall, with the inland side of the beam extending over the prepared earth and the water end of the beam extending over the water's surface.

Referring now to FIG. 9, the first cantilevered Z beam 1 is unloaded from the truck with a fork-lift, suitable crane or manpower and set onto the top of the existing sea wall (or optional pre-cast sea wall 0). FIG. 10 shows the heel 2 of the cantilevered Z beam 1 against the sea wall with wedging 3 (typically polychloride vinyl or similar mastic or hydraulic cement or other suitable wedging material) in the heel 2. The wedging 3 provides a cushion for both load bearing and to displace bending stress (moment) to the water-side surface of the sea wall and earth dead weight behind the sea wall.

Figure 11:
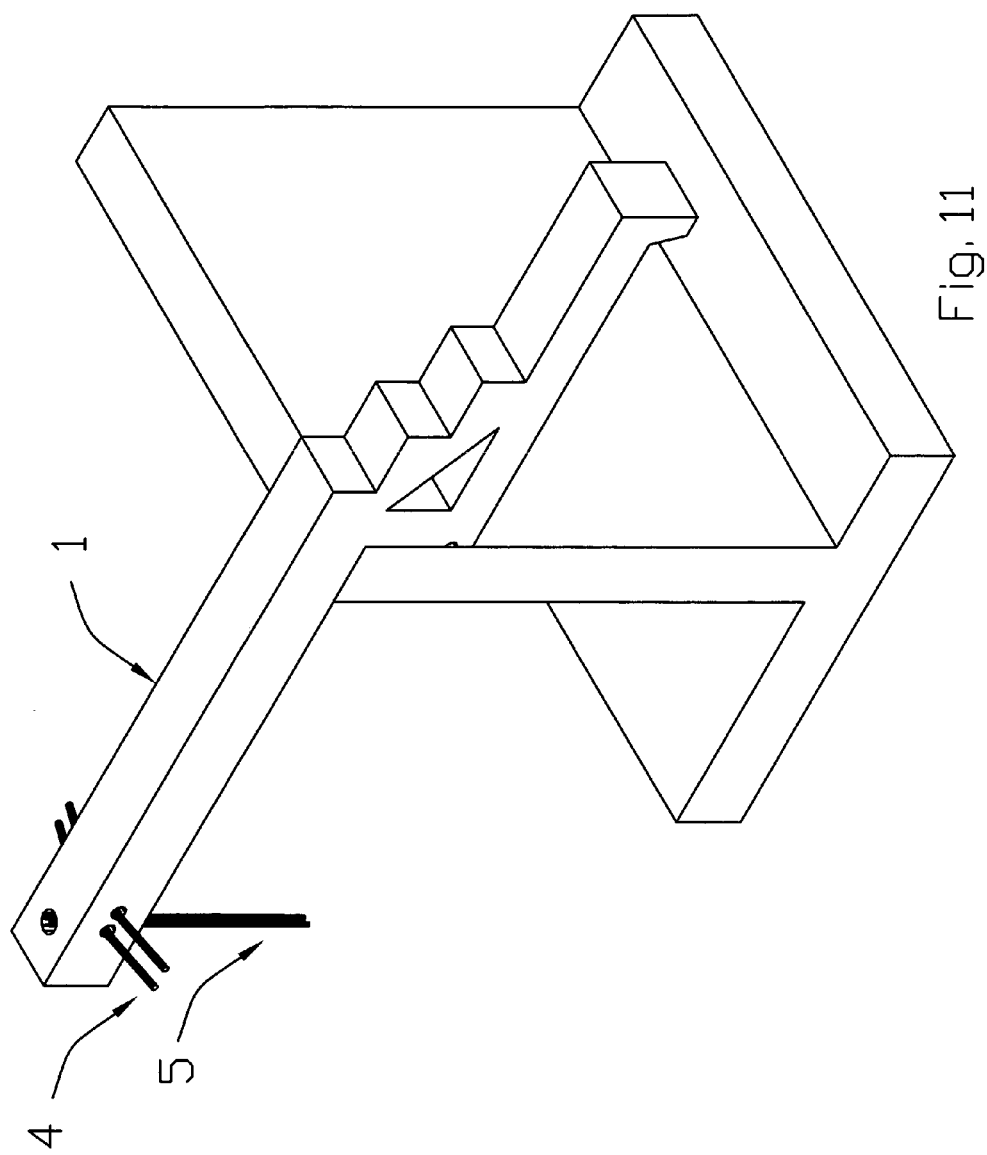
FIG. 11 depicts the beam, sea wall and industry standard rebars in the holes of the inland side of the beam.
Figure 12:
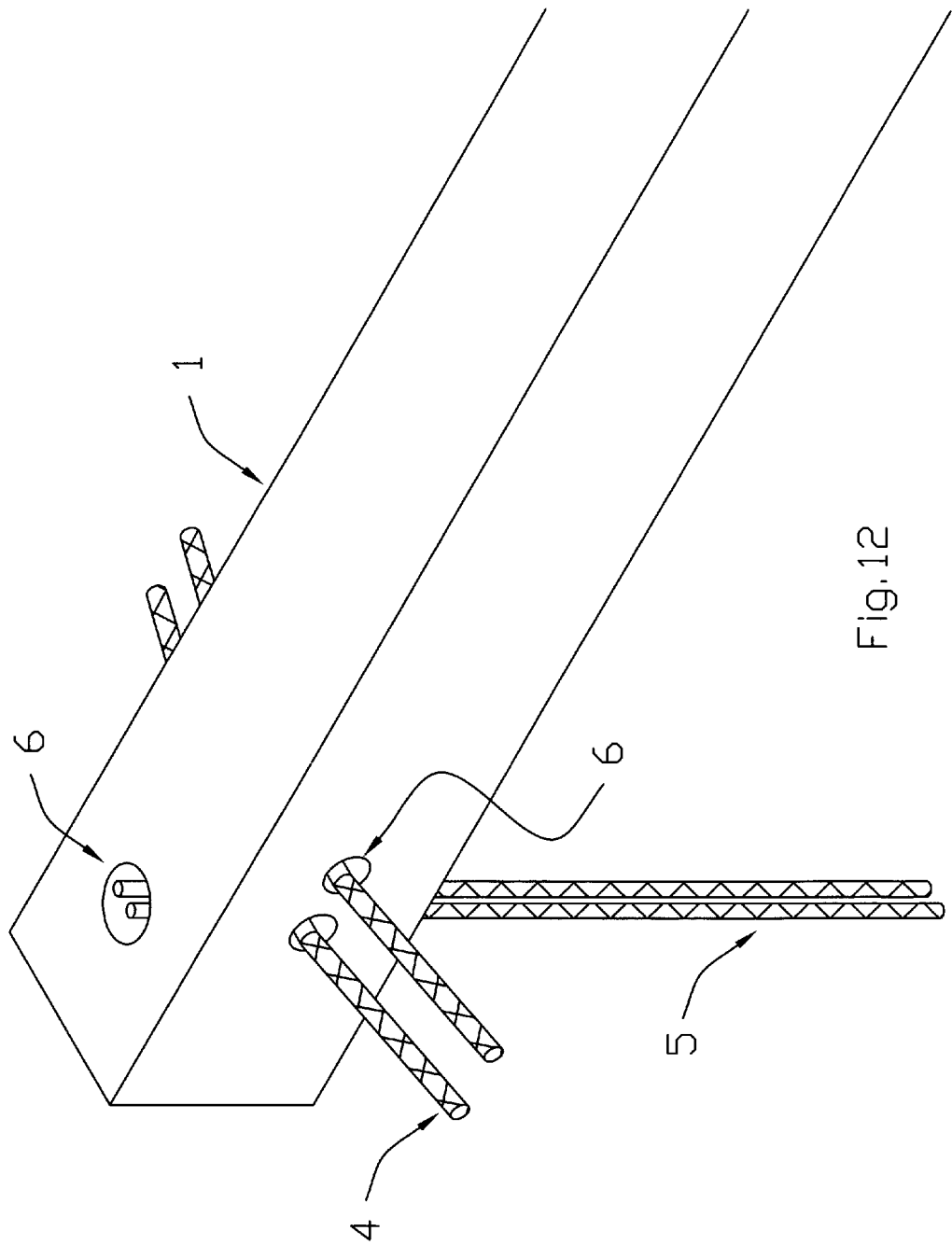
FIG. 12 depicts a close-up detail of the industry standard rebars in the holes of the inland side of the beam.
Figure 14:
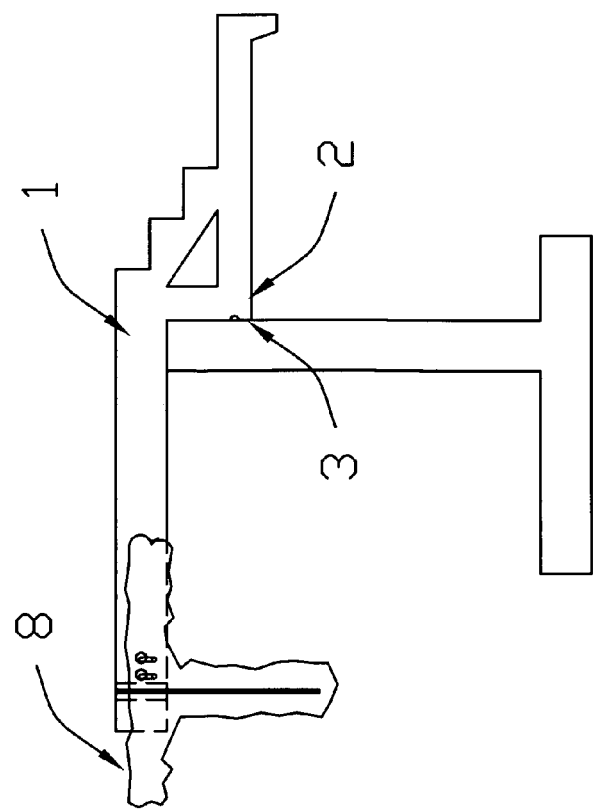
FIG. 14 depicts a side sectional view of the partial system with the earth anchor (concrete deadman) poured in place, securing the inland side of the beam.
Figure 13:
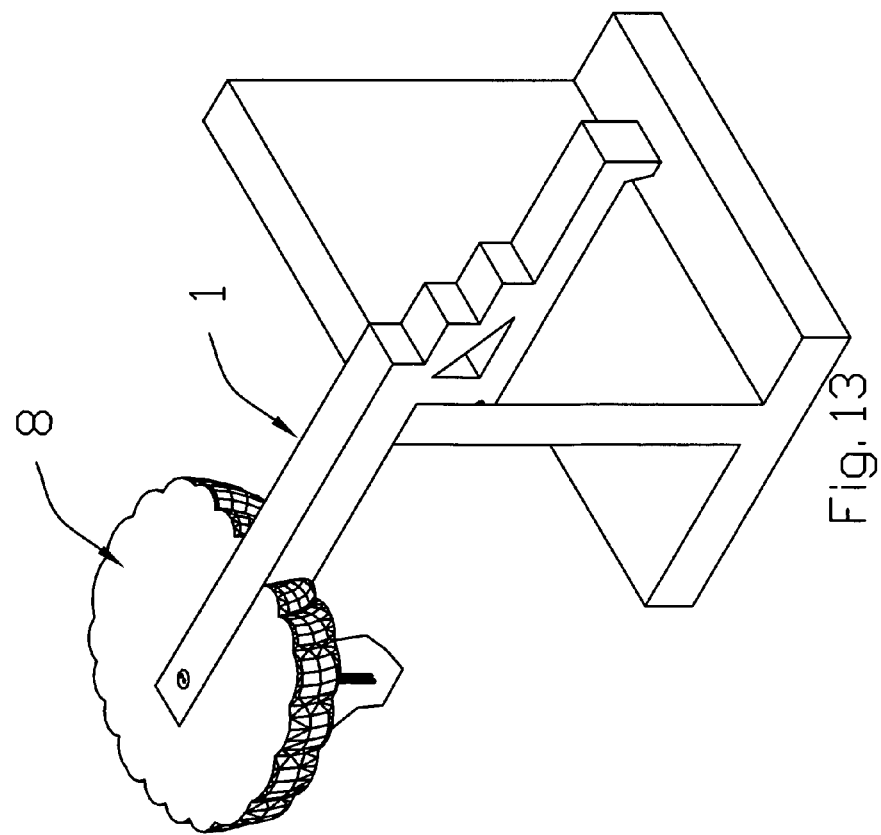
FIG. 13 depicts a perspective view of the partial system with the earth anchor (concrete deadman) poured in place, securing the inland side of the beam.

Next, as shown in FIG. 11 and FIG. 12, at least one horizontal rebar(s) 4 and optional vertical rebar(s) 5, if desired, in the pre-formed holes 6 in the inland end 7 to be used as an earth anchor. The earth anchor is shown in FIG. 13 and FIG. 14 by excavating or forming a deadman 8 about 3 feet in diameter and 1 foot deep around the inland end 7 of the cantilevered Z beam 1 and poured solidly with concrete (typically 2,500 PSI) and allowed to cure, which encases completely the horizontal rebar(s) 4 and optional vertical rebar(s) 5 in the pre-formed holes 6. The deadman 8 prevents uplift at the inland end 7 of the cantilevered Z beam 1 and helps keep the sea wall rigid and helps prevent "creep" of the sea wall due to the earth's static pressure.

Figure 16:
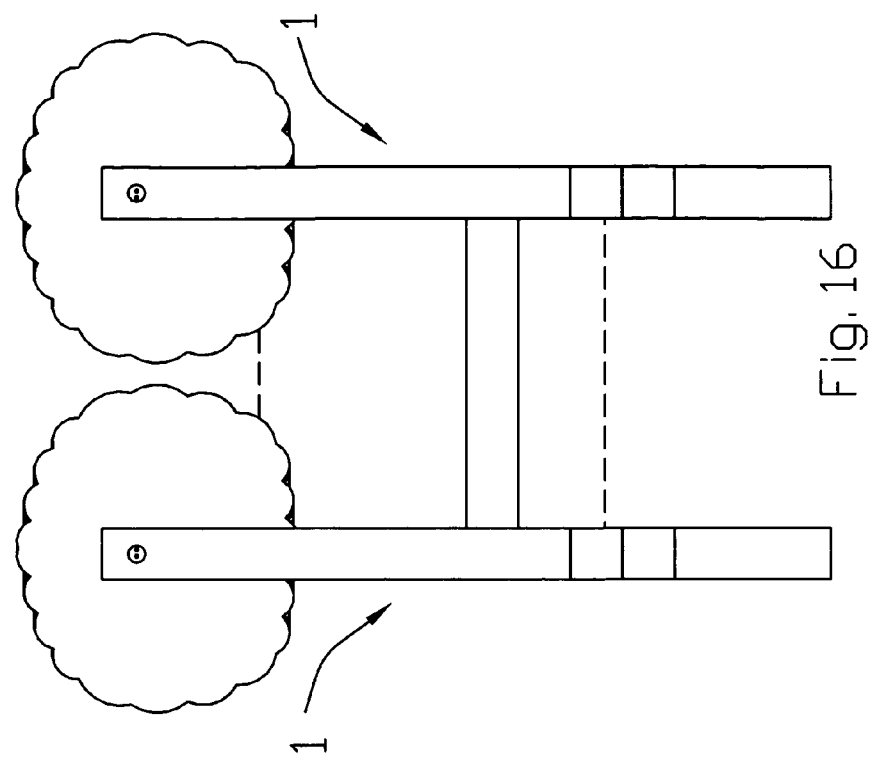
FIG. 16 depicts a top view of the partial system with the earth anchor (concrete deadman) poured in place, securing the inland side of two (2) beams.
Figure 15:
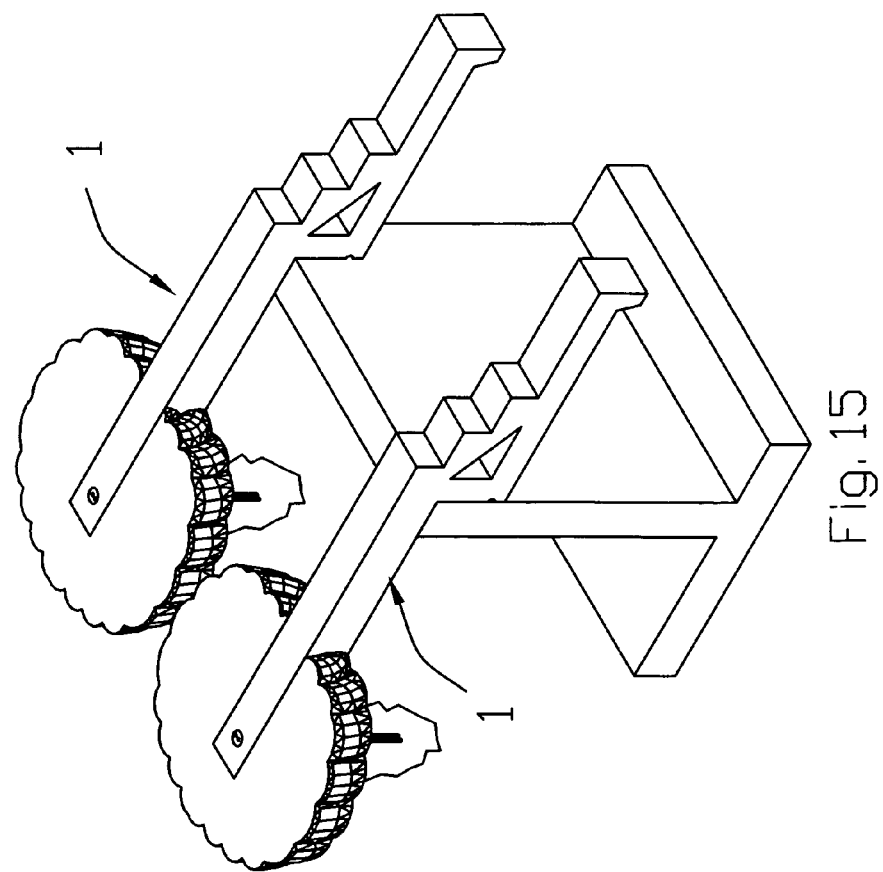
FIG. 15 depicts a perspective view of the partial system with the earth anchor (concrete deadman) poured in place, securing the inland side of two (2) beams.

The second cantilevered Z beam 1 is unloaded from the truck and installed in the exact same above-referenced manner as shown in FIG. 15 and FIG. 16 about 8 feet parallel to the first cantilevered Z beam 1.

Figure 18:
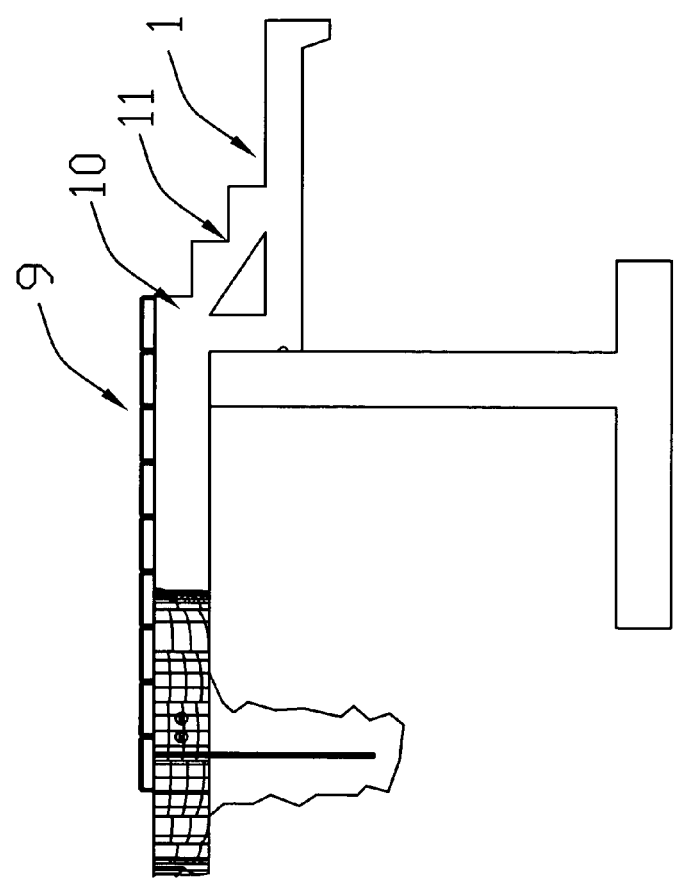
FIG. 18 depicts a side sectional view of the partial system with the deck slabs on the top surface of the inland end of the beam.
Figure 17:
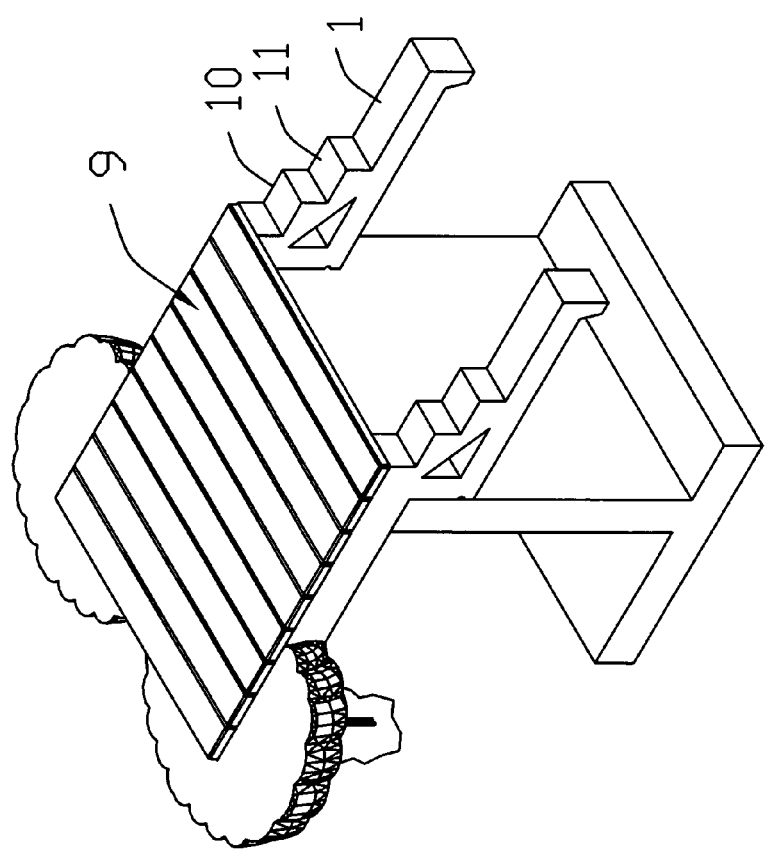
FIG. 17 depicts a perspective view of the partial system with the deck slabs on the top surface of the inland end of the beam.

Then, the slab(s) 9 are unloaded from the truck and placed perpendicular to and spanning between on the top surface of the inland end 7 of the first and second cantilevered Z beams 1 one at a time until (9) nine slabs are laid on the inland-side top surfaces of the first and second cantilevered Z beams 1, making the deck, a shown in FIG. 17 and FIG. 18. All slabs are integrated onto the top surface of the cantilevered Z beam(s) 1 with their dead weight and secured with an appropriate adhesive mastic.

Figure 20:
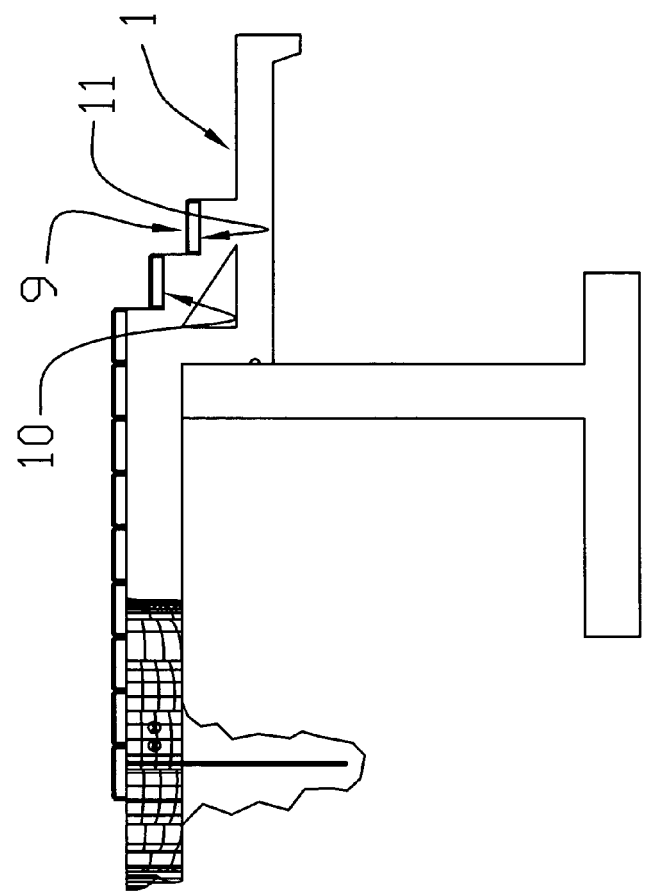
FIG. 20 depicts a side sectional view of the partial system with the deck slabs on the top surface of the inland end of the beam and step slabs integrated into the top surface of the beam.
Figure 19:
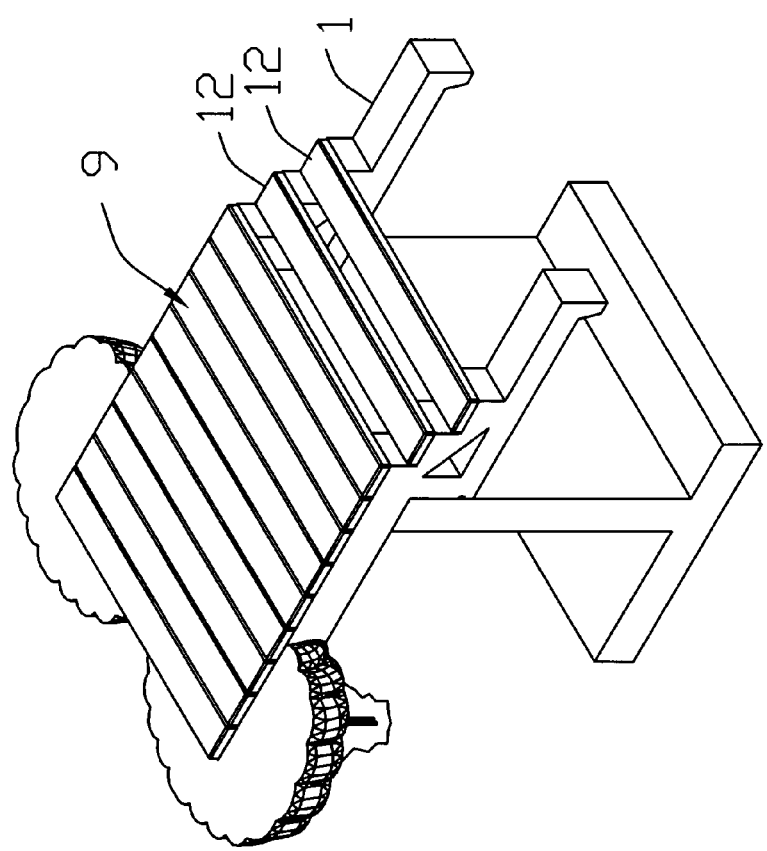
FIG. 19 depicts a perspective view of the partial system with the deck slabs on the top surface of the inland end of the beam and step slabs integrated into the top surface of the beam.

Then, (1) one slab 9 is placed perpendicular to and spanning between on the top surface of the step one 10 and (1) one slab 9 is placed perpendicular to and spanning between on the top surface of step two 11, as shown in FIG. 19 and FIG. 20, making (2) steps with 8 inch risers 12.

Figure 22:
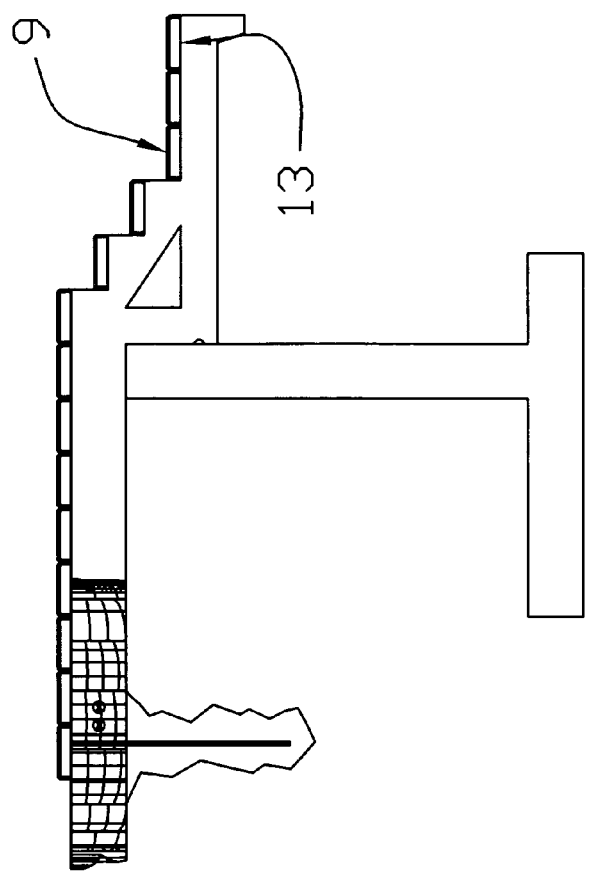
FIG. 22 depicts a side sectional view of the completed system with the deck slabs on the top surface of the inland end of the beam, step slabs integrated into the top surface of the beam and dock slabs on the top surface of the water side of the beam.
Figure 21:
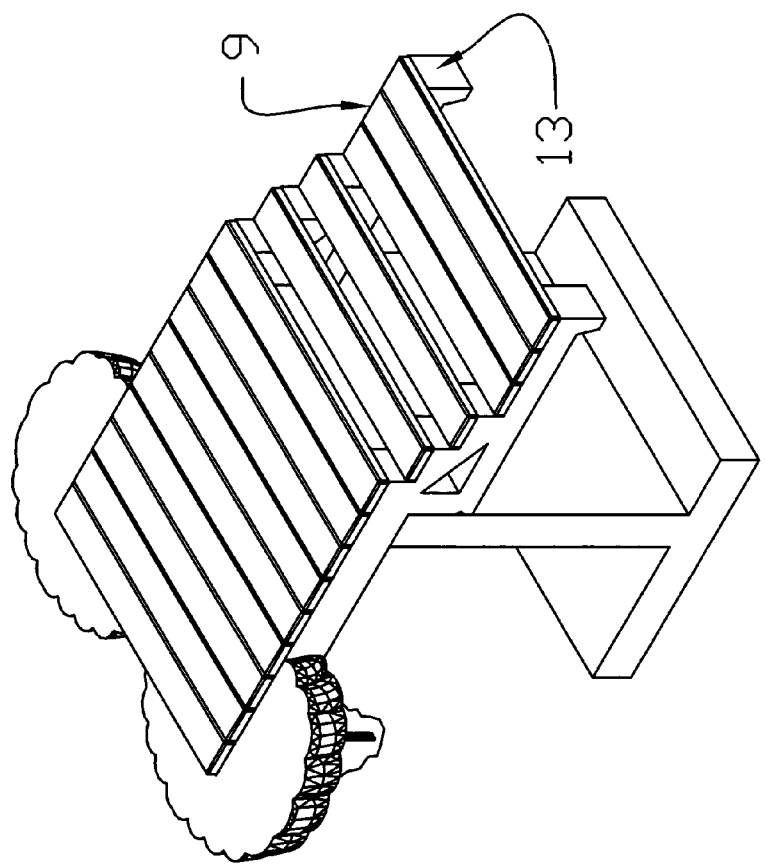
FIG. 21 depicts a perspective view of the completed system with the deck slabs on the top surface of the inland end of the beam, step slabs integrated into the top surface of the beam and dock slabs on the top surface of the water side of the beam.

Next, the last (3) three slab(s) 9 are placed perpendicular to and spanning between on the top surface of the water end 13 of the first and second cantilevered Z beams 1 one at a time until the (3) three slabs are laid on the water end 13 top surfaces of the first and second cantilevered Z beams 1, making the dock, a shown in FIG. 21 and FIG. 22. The invention is completed and ready to use. Throughout this application, (s) indicates either singular or plural.

Figure 23:
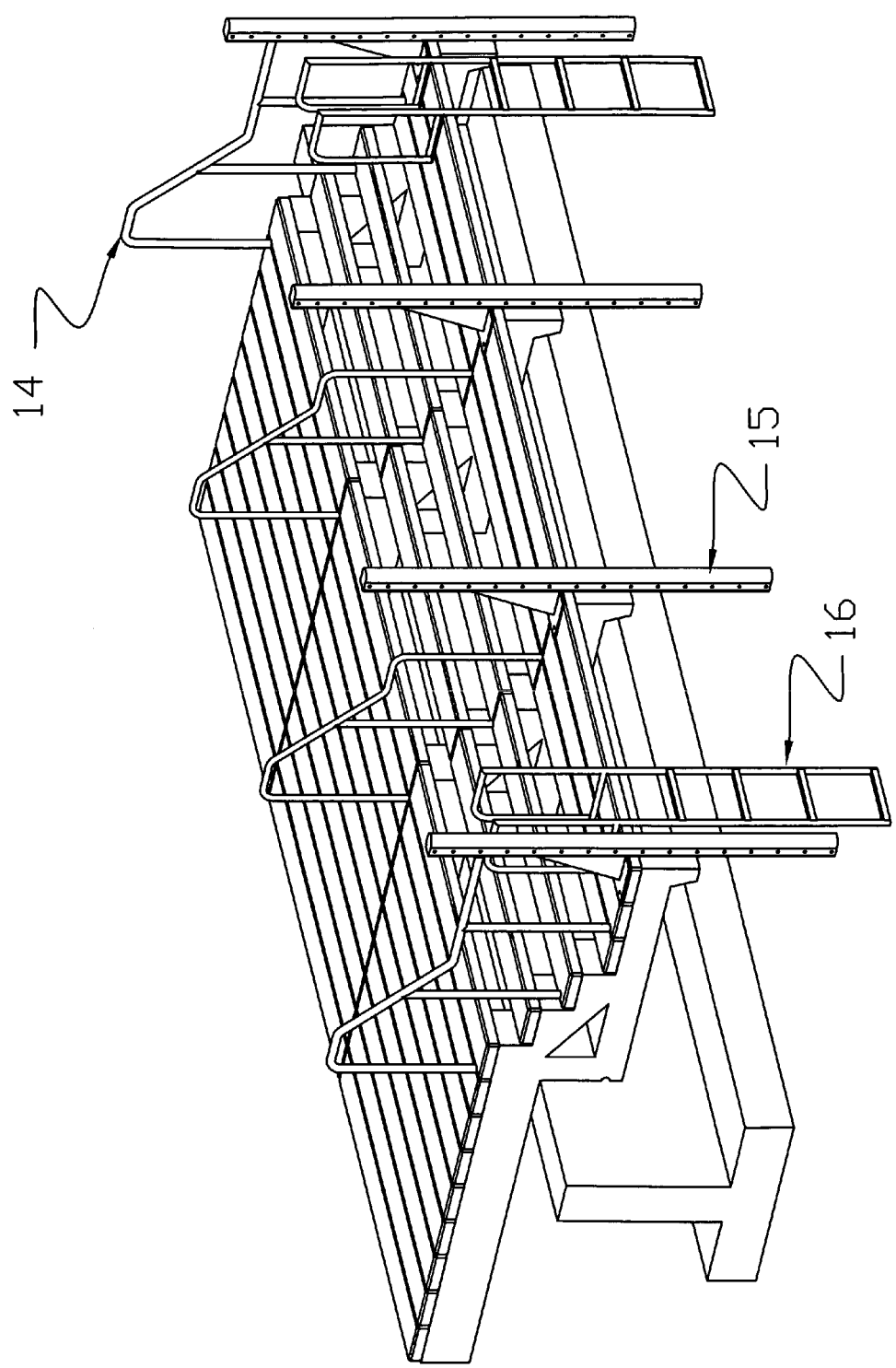
FIG. 23 depicts a perspective view of the completed deck, dock steps and dock system with the optional hand rails, boat bumpers and water access ladders integrated into the system.
Figure 24:
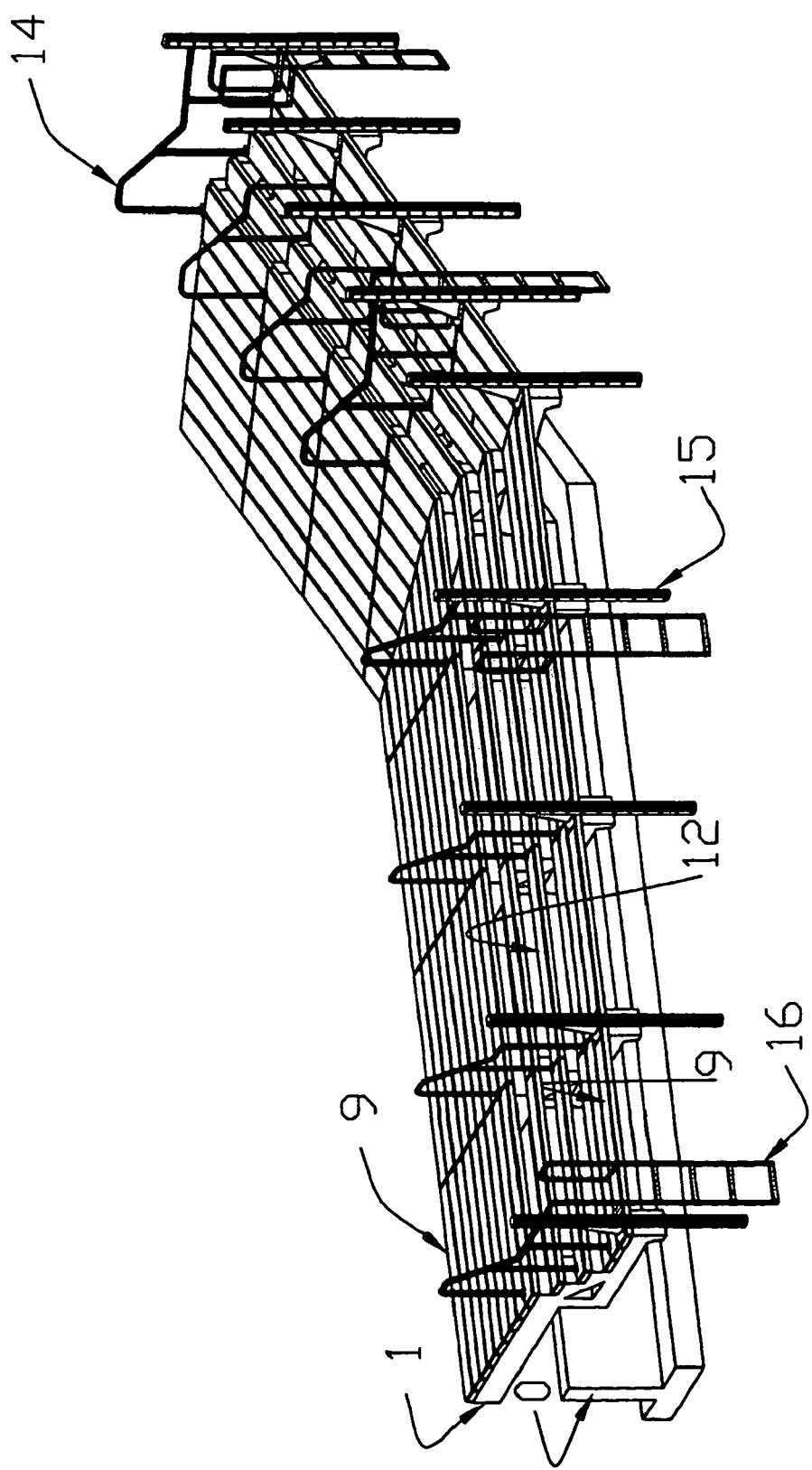
FIG. 24 depicts an alternative embodiment of the dock and dock steps system with an angled front edge at the water line (curved front edge may also be used).

If desired, more units may be added in the exact same manner above-described (in the appropriate dimensions i.e. end-to-end, end-to-center or center-to-center) and other optional components may be added (attached with typical concrete anchoring devices or fasteners) such as hand rail(s) 14, boat bumper-rails 15 (either vertical or horizontal) and water access ladder(s) 16 as shown in FIG. 23. Optionally, a slip resistance surface coating may be applied to one, some or all of the slabs. Or, roughened top surfaces of the slabs may be integrated in the forms when manufactured in the pre-cast plant.

As will be apparent to persons skilled in the art, such as a structural engineer, pre-cast concrete manufacturer or pre-cast concrete builder, various modifications and adaptations of the structure and method of use above-described will become readily apparent without departure from the spirit and scope of the invention, the scope of which is defined in the claims. Although the foregoing invention has been described in detail by way of illustration and example, it will be understood that the present invention is not limited to the particular description and specific embodiments described but may comprise any combination of the above elements and variations thereof, many of which will be obvious to those skilled in the art. Additionally, the acts and actions of fabricating, assembling, using, and maintaining the preferred embodiment of this invention is well known by those skilled in the art. Instead, the invention is limited and defined solely by the following claims.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An article of manufacture, comprising:
    a cantilevered structural support further comprising at least one horizontal or nearly horizontal member further comprising an inland end and a water end, wherein the horizontal or nearly horizontal member is set on top of and perpendicular to an existing sea wall to define the inland end and the water end of the horizontal or nearly horizontal member, and;

at least one earth anchor integrated into the inland end of the horizontal or nearly horizontal member, and;

at least one deck integrated onto the top surface of the inland end of the horizontal or nearly horizontal member, and;

at least one dock step integrated into the top surface between the inland end and the water end of the horizontal or nearly horizontal member, and;

at least one dock integrated onto the top surface of the water end of the horizontal or nearly horizontal member.

2. The cantilevered structural support of claim 1 wherein said horizontal or nearly horizontal member further comprises a pre-cast reinforced concrete beam.

3. The cantilevered structural support of claim 1 wherein said deck, dock step(s) and dock each further comprise at least one pre-cast reinforced concrete slab.

4. The cantilevered structural support of claim 1 wherein said earth anchor further comprises at least one concrete industry-standard rebar horizontally, or within 45 degrees of horizontal, integrated and poured solidly with a concrete foundation into said inland end of said horizontal or nearly horizontal member.

5. The cantilevered structural support of claim 1 wherein said earth anchor further comprises at least one concrete industry-standard rebar vertically, or within 45 degrees of vertical, integrated and poured solidly with a concrete foundation into said inland end of said horizontal or nearly horizontal member.

6. The cantilevered structural support of claim 1 wherein said deck, dock step(s) and dock each further comprise a slip-resistance top surface either applied onto or disposed into the top surface of said deck, dock step(s) and dock either during or after manufacture.

7. The cantilevered structural support of claim 1 further comprising additional components selected from the group consisting of hand rail(s), boat bumper-rail(s) and water access ladder(s).

8. The cantilevered structural support of claim 1 further comprising a pre-cast reinforced concrete sea wall.

9. A system, comprising:
a cantilevered structural support further comprising at least one horizontal or nearly horizontal member further comprising an inland end and a water end, wherein the horizontal or nearly horizontal member is set on top of and perpendicular to an existing sea wall to define the inland end and the water end of the horizontal or nearly horizontal member, and;

at least one earth anchor integrated into the inland end of the horizontal or nearly horizontal member, and;

at least one deck integrated onto the top surface of the inland end of the horizontal or nearly horizontal member, and;

at least one dock step integrated into the top surface between the inland end and the water end of the horizontal or nearly horizontal member, and;

at least one dock integrated onto the top surface of the water end of the horizontal or nearly horizontal member.

10. The system of claim 9 wherein said horizontal or nearly horizontal member further comprises a pre-cast reinforced concrete beam.

11. The system of claim 9 wherein said deck, dock step(s) and dock each further comprise at least one pre-cast reinforced concrete slab.

12. The system of claim 9 wherein said earth anchor further comprises at least one concrete industry-standard rebar horizontally, or within 45 degrees of horizontal, integrated and poured solidly with a concrete foundation into said inland end of said horizontal or nearly horizontal member.

13. The system of claim 9 wherein said earth anchor further comprises at least one concrete industry-standard rebar vertically, or within 45 degrees of vertical, integrated and poured solidly with a concrete foundation into said inland end of said horizontal or nearly horizontal member.

14. The system of claim 9 wherein the deck, dock step(s) and dock each further comprise a slip-resistance top surface either applied onto or disposed into the top surface of said deck, dock step(s) and dock either during or after manufacture.

15. The system of claim 9 further comprising additional components selected from the group consisting of hand rail(s), boat bumper-rail(s) and water access ladder(s).

16. The system of claim 9 further comprising a pre-cast reinforced concrete sea wall if no sea wall.

* * * * *